US012583102B2

(12) United States Patent　　(10) Patent No.: US 12,583,102 B2
　　Kaspar　　　　　　　　　　　　(45) Date of Patent: Mar. 24, 2026

(54) METHOD AND SYSTEM FOR HANDLING A LOAD ARRANGEMENT WITH A ROBOT GRIPPER

(71) Applicant: KUKA DEUTSCHLAND GMBH, Augsburg (DE)

(72) Inventor: Manuel Kaspar, Oberammergau (DE)

(73) Assignee: KUKA Deutschland GmbH (DE)

( * ) Notice: Subject to any disclaimer, the term of this patent is extended or adjusted under 35 U.S.C. 154(b) by 187 days.

(21) Appl. No.: 18/042,051

(22) PCT Filed: Aug. 12, 2021

(86) PCT No.: PCT/EP2021/072498
　　§ 371 (c)(1),
　　(2) Date: Feb. 17, 2023

(87) PCT Pub. No.: WO2022/038040
　　PCT Pub. Date: Feb. 24, 2022

(65) Prior Publication Data
　　US 2023/0302635 A1　　Sep. 28, 2023

(30) Foreign Application Priority Data
　　Aug. 19, 2020　(DE) ..................... 10 2020 210 537.5

(51) Int. Cl.
　　*B25J 9/16*　　　　(2006.01)
　　*B25J 9/00*　　　　(2006.01)
　　*B25J 15/06*　　　(2006.01)
(52) U.S. Cl.
　　CPC ............. *B25J 9/163* (2013.01); *B25J 9/0096* (2013.01); *B25J 9/1612* (2013.01); *B25J 9/1638* (2013.01); *B25J 9/1653* (2013.01); *B25J 15/0616* (2013.01)

(58) Field of Classification Search
　　CPC ........ B25J 9/163; B25J 9/0096; B25J 9/1612; B25J 9/1638; B25J 9/1653; B25J 15/0616;
　　　　　　　　　　　　　　(Continued)

(56) References Cited

U.S. PATENT DOCUMENTS 5,136,687　A　　8/1992　Edelman et al.
9,126,337　B2 *　9/2015　Iwatake ................. B25J 9/1694
　　　　　　　　(Continued)

FOREIGN PATENT DOCUMENTS

CA　　　　3118595　A1 *　5/2020　............ B25J 9/1612
DE　　　690 33 681　T2　　8/2001
　　　　　　　　(Continued)

OTHER PUBLICATIONS

Leahy Jr M B et al. Neural Network Payload Estimation for Adaptive Robot Control IEEE Transactions on Neural Networks, IEEE Service Center, Piscataway, NJ, US, vol. 2, No. 1, Jan. 1, 1991 (Jan. 1, 1991), pp. 93-100 DOI: 10.1109/72.80294 ISSN: 1045-9227, XP000202656 the whole document.
　　　　　　　　(Continued)

*Primary Examiner* — Jonathan L Sample
(74) *Attorney, Agent, or Firm* — Dorton & Willis, LLP

(57)　　　　　ABSTRACT

A method for handling a load arrangement with a robot includes:
　　activating a lifting state of a gripper of the robot for load lifting;
　　determining a parameter of a time profile of a load arrangement-dependent force variable using at least one sensor of the robot during a movement of the lifted load arrangement;
　　classifying a load arrangement lifted by the gripper using a machine-learned model on the basis of the determined parameter, in particular during a movement of the lifted
　　　　　　　　(Continued)

load arrangement and/or over the pick-up area in which the load arrangement has been situated for lifting, in particular a pick-up area of a pick-up station and/or over or in a pick-up container;

and at least one of the steps of:

carrying out a first process with the robot if the load arrangement has been classified into a first class; and/or carrying out a second process with the robot if the load arrangement has been classified into a second class.

18 Claims, 1 Drawing Sheet

(58) Field of Classification Search
CPC .. B25J 9/161; B25J 13/08; G05B 2219/39107
USPC .................................................. 700/245–264
See application file for complete search history.

(56) References Cited

U.S. PATENT DOCUMENTS

| | | | | |
|---|---|---|---|---|
| 10,576,681 | B2 | 3/2020 | Smeulders | |
| 11,123,862 | B2 * | 9/2021 | Ottnad | B25J 15/0616 |
| 11,173,599 | B2 * | 11/2021 | Levine | G06V 10/82 |
| 11,345,029 | B2 * | 5/2022 | Mizoguchi | B25J 9/1653 |
| 11,478,942 | B1 * | 10/2022 | Lee | B25J 18/025 |
| 11,780,095 | B2 * | 10/2023 | Yamazaki | B25J 9/1612 |
| | | | | 700/259 |
| 11,820,023 | B2 * | 11/2023 | Sugahara | B25J 13/089 |
| 11,904,468 | B2 * | 2/2024 | Mizoguchi | B25J 19/023 |
| 11,958,191 | B2 * | 4/2024 | Diankov | B25J 13/08 |

| | | | | |
|---|---|---|---|---|
| 2019/0126471 | A1 * | 5/2019 | Kobayashi | B25J 9/163 |
| 2020/0130935 | A1 * | 4/2020 | Wagner | B65G 1/1371 |
| 2020/0164517 | A1 * | 5/2020 | Dick | B25J 9/1682 |
| 2020/0270069 | A1 * | 8/2020 | Bellar | G06Q 10/08 |
| 2020/0331709 | A1 * | 10/2020 | Huang | B65G 47/905 |
| 2020/0338722 | A1 * | 10/2020 | Jang | G06N 3/0464 |
| 2021/0023711 | A1 * | 1/2021 | Lee | B25J 9/163 |
| 2023/0356387 | A1 * | 11/2023 | Kalouche | B25J 19/021 |

FOREIGN PATENT DOCUMENTS

| | | | |
|---|---|---|---|
| DE | 10 2012 001 265 A1 | 7/2013 | |
| DE | 10 2014 005 758 B4 | 6/2015 | |
| DE | 10 2016 220 643 A1 | 4/2018 | |
| DE | 20 2018 103 922 U1 | 8/2018 | |
| DE | 10 2018 208 126 A1 | 11/2019 | |
| JP | 2020062707 A | 4/2020 | |
| KR | 1020170013925 A | 2/2017 | |

OTHER PUBLICATIONS

European Patent Office; Search Report in related International Patent Application No. PCT/EP2021/072498 dated Dec. 2, 2021; 2 pages.

German Patent Office; Search Report in related German Patent Application No. 10 2020 210 537.5 dated Apr. 19, 2021; 7 pages.

Chinese Patent Office; Office Action in related Chinese Patent Application No. 2021800689741 dated Oct. 30, 2025; 9 pages.

European Patent Office; Search Report in related European Patent Application No. 21 758 708.8 dated Dec. 8, 2025; 7 pages.

Korean Patent Office; Search Report in related Korean Patent Application No. 10-2023-7008588 dated Nov. 14, 2025; 8 pages.

* cited by examiner

METHOD AND SYSTEM FOR HANDLING A LOAD ARRANGEMENT WITH A ROBOT GRIPPER

CROSS-REFERENCE TO RELATED APPLICATIONS

This application is a national phase application under 35 U.S.C. § 371 of International Patent Application No. PCT/EP2021/072498, filed Aug. 12, 2021 (pending), which claims the benefit of priority to German Patent Application No. DE 10 2020 210 537.5, filed Aug. 19, 2020, the disclosures of which are incorporated by reference herein in their entirety.

TECHNICAL FIELD

The present invention relates to a method for handling a load arrangement with a robot and to a system and computer program product for carrying out the method.

BACKGROUND

A robot gripper with multiple suction elements is known from DE 10 2016 220 643 A1.

In particular with such grippers it can happen that too many objects or loads are unintentionally lifted together and then, for example, unintentionally put together into a package or a container.

SUMMARY

An object of an embodiment of the present invention is to improve the handling of load arrangements with a robot (gripper), preferably to eliminate unintentional lifting of too many and/or incorrect loads or objects.

This object is achieved by a method and a system or computer program product for carrying out a method, as described herein.

According to one embodiment of the present invention, a method for handling a load arrangement with a robot comprises the following steps, which in one embodiment are carried out successively or follow one another:

activating a lifting state of a gripper of the robot for load lifting;

determining a unidimensional or multidimensional parameter of a time profile of a load-arrangement-dependent force variable using one or more sensors of the robot during a movement of the lifted load arrangement (by or with the aid of the robot); and classifying a load arrangement lifted by the gripper using, in one embodiment by, a machine-learned model on the basis of the determined parameter, in one embodiment (still) during a movement of the lifted load arrangement (by or with the aid of the robot) and/or classifying (while the lifted load arrangement is still located, in particular moving) over a pick-up area, in particular a specified or delimited pick-up area, in which the load arrangement for lifting has been located, in particular has been lifted, in one embodiment over a pick-up area of a pick-up station and/or over or in a pick-up container, in particular therefore classifying during a movement of the lifted load arrangement (by or with the aid of the robot) (still) over the pick-up area;

and at least one of the steps of:

carrying out a first process with the robot if the load arrangement is (has been) classified into a first class or assigned to a first class; and/or carrying out a second process with the robot if the load arrangement is (has been) classified into a second class or assigned to a second class.

By classifying the load arrangement lifted by the gripper using a machine-learned model on the basis of the determined parameter of the time profile of a load-arrangement-dependent force variable, in one embodiment it is advantageously still possible during the movement of the lifted load arrangement (by or with the aid of the robot) to react accordingly and/or to prevent or reduce a standstill for measuring a weight of the load arrangement after decay of an (oscillation) dynamic, and thus to shorten a process time. Additionally or alternatively, simpler and thus in particular more reliable and/or cheaper sensors can be used in one embodiment as a result. This results in particular from the fact that different load arrangements differ from one another in the time profiles of load-arrangement-dependent force variables such that they can be classified particularly well using machine-learned models.

In one embodiment, the method comprises the step of: carrying out a third process with the robot if the load arrangement is (has been) classified into a third class or assigned to a third class; in a further development, the method comprises the step of: carrying out a fourth process with the robot if the load arrangement is (has been) classified into a fourth class or assigned to a fourth class. In one embodiment, one or more further classes can be provided, wherein in each case a corresponding, class-specific further process is carried out with the robot if the load arrangement is assigned to a further (one of these) class(es).

As a result, in one embodiment, it is advantageously possible to react (more) specifically to different load arrangements.

Thus, in particular a lifted object can be picked normally (first process) if the load arrangement is classified as a load arrangement with (only) one (single) object, two lifted objects can be picked sequentially in two stages (second process) if the load arrangement is classified as a load arrangement with (exactly) two objects, and three lifted objects can be picked sequentially in three stages (third process) if the load arrangement is classified as a load arrangement with (exactly) three objects.

Alternatively, for example, instead of the two-stage and/or instead of the three-stage sequential picking operation, the lifted load arrangement can be released, in particular over the pick-up area (second or third process) without being picked in the process or thereby, if the load arrangement is classified as a load arrangement with the wrong object number.

Likewise, in one embodiment, a lifted object can be picked (first process) if the load arrangement is classified as a load arrangement with an object of the correct type, and the lifted load arrangement can be released over the pick-up area (second process) without being picked in the process or thereby, if the load arrangement is classified as a load arrangement with the wrong object type. Alternatively, for example, the object can also be picked at a second picking station (second process) if the load arrangement is classified as a load arrangement with an object of a second type.

In one embodiment, the robot has a robot arm with at least three, in particular at least six, in one embodiment at least seven joints, in particular pivot joints, on the (end) flange of which the gripper is arranged, in one embodiment releasably fastened.

In particular due to the flexible possibilities of using such robots, the present invention is particularly advantageous for this purpose.

In one embodiment, activation of a lifting state comprises switching into an operating mode in which the gripper can lift loads or objects or exerts a corresponding gripping force on one or more loads or objects. If, in one embodiment, the gripper is a pneumatic gripper with one or more suckers, activation of its lifting state in one embodiment comprises activation, in particular vacuum generation, of the or of one or more, preferably of all of the, suckers. If, in one embodiment, the gripper is additionally or alternatively a mechanical gripper with one or more movable, in particular pivotable, gripping jaws, an activation of its lifting state in one embodiment comprises the closing of the or of one or more, preferably of all of the, gripping jaws. In one embodiment, deactivation correspondingly comprises a deactivation of suckers or opening of gripping jaws.

Because the load arrangement is classified while it is still located over the pick-up area, in particular over or in the pick-up container, in one embodiment, incorrect or an excessive number of lifted objects or loads can advantageously be put back or dropped and subsequently lifted again (more) easily.

As explained above, an embodiment of the present invention is particularly suitable for eliminating an unintentional lifting of too few and/or, particularly advantageously, of too many loads or objects. Accordingly, in one embodiment, the first and second and, if applicable, third, fourth and/or further class(es) differ from one another in the number of loads or objects, in one embodiment similar loads or objects, that are lifted by the gripper.

In one embodiment, the first class is a class with only a single object or only a single load ("single grip").

Additionally or alternatively, in one embodiment, the second and/or third and/or fourth classes are (in each case) a class with multiple objects or loads ("multiple grip") and/or one of the second and, if applicable, third and, if applicable, fourth class is a class without an object or load ("failed grip"). In a further development, the second class is a class with more than one object, or the second class is a class with exactly two objects, and the third class is a class with more than two objects. In a further development, when a gripper is empty after a lifting state has been activated, the load arrangement lifted by the gripper is classified into the class without an object or load, or in the case of a more compact gripper which is empty even after a lifting state has been activated, the load arrangement is more generally referred to as a load arrangement which has been lifted by the gripper and which then does not have an object or corresponds to the empty quantity.

As a result, in one embodiment, it is advantageously possible to react (more) specifically to different load arrangements.

The present invention can therefore be used in one embodiment for lifting load arrangements with different numbers of objects or loads, in one embodiment similar objects or loads, but is not limited thereto.

Likewise, additionally or alternatively to a number of the lifted objects or loads, in one embodiment, the first, second or, if applicable, third and/or fourth processes can also be carried out depending on the classified type of loads lifted by the gripper.

In particular, the first class can be a class of a first type of objects or loads, and the second class can be a class of different (types of) objects, in one embodiment of a second type of objects or loads, wherein, in one further development, the first process can then comprise a transfer movement of the lifted load arrangement using the robot to a first picking station, and the second process can comprise a different picking operation or transfer movement of the lifted load arrangement using the robot to a second picking station or also a deactivation of the lifting state of the gripper over the pick-up area and a new lifting attempt (with the correct object type or load type).

Additionally or alternatively to a number and/or type of the lifted objects or loads, in one embodiment, the first, second or, if applicable, third and/or fourth processes can also be carried out depending on the distribution of the loads lifted by the gripper, in one embodiment depending on the distribution or position(s) relative to, in particular on, the gripper.

Thus, in particular, the first class can comprise a class with a first load, which is suction-gripped by a portion of a quantity of multiple suckers of the gripper together, and a second load suction-gripped by one or more other suckers of the gripper, and the second class can be a class with the first and second loads, which are suction-gripped in another configuration by the suckers, wherein in one further development, the first process can then comprise a deactivation of the other sucker(s), and the second process can comprise a partial deactivation different therefrom, in which also at least one of the suckers is deactivated, while one or more suckers identified as bearing the first load remain activated. In other words, in one embodiment, the machine-learned model identifies the distribution or position(s) of the lifted loads relative to, in particular on, the gripper, in which case different lifting devices, in particular suckers, of the gripper are then deactivated in a targeted manner in the first, second and, if applicable, third and, if applicable, fourth processes in order to release one or more of these loads, while at least one further of the lifting devices identified as load-bearing remains activated.

Accordingly, the classes differ in one embodiment in the number, distribution and/or type of loads lifted by the gripper.

As already explained, in one embodiment the gripper has two or more lifting devices, in one further development two or more, preferably at least three, suckers. Since an unintentional lifting of too many loads or objects can occur (more) often with such suction grippers, the present invention is particularly advantageous for this purpose.

In one embodiment, the at least one sensor is arranged on the gripper, between the gripper and a or the robot arm to which it is fastened, or on the robot arm. In one embodiment, the sensor is a force and/or torque sensor and/or arranged on the robot arm flange or between the gripper and the robot arm or on one of the joints of the robot (arm). As a result, in one embodiment, time profiles of load-arrangement-dependent force variables can be captured particularly advantageously, in particular in a process-reliable and/or (more) simple manner.

In one embodiment, the unidimensional or multidimensional force variable depends on at least one load-arrangement-dependent force component, which is vertical in one embodiment, and/or at least one load-arrangement-dependent torque component, can in particular have, in particular be, this/these force or torque component(s). These are particularly advantageously suitable for the classification of lifted load arrangements.

In one embodiment, the unidimensional or multidimensional time profile of the load-arrangement-dependent force variable is captured with the sensor(s) and/or in one embodiment extends over at least 0.5 seconds, in particular at least 1 second, in one embodiment at least 2 seconds. In one embodiment, it is sampled at a sampling rate of at least 0.01 kHz.

In one embodiment, the unidimensional or multi-dimensional parameter of the time profile comprises the time profile itself, can in particular be the time profile. Additionally or alternatively, it can also have, in particular be, one or more variables or values derived from the time profile, in one embodiment by signal analysis and/or numerically, in particular one or more variables of a frequency analysis or Fourier analysis, integration and/or differentiation of the time profile, average and/or extreme values, or the like.

In one embodiment, the load arrangement lifted by the gripper is classified using the machine-learned model on the basis of the determined parameter of the time profile of the load-arrangement-dependent force variable and further determined actual values, in one embodiment actual values determined using at least one sensor of the robot and/or kinematic actual values, in one embodiment axis positions, axis speeds and/or axis accelerations or the like, in one embodiment time profiles thereof.

As a result, in one embodiment, in particular in combination with two or more of the aforementioned features, the load arrangement can be classified particularly advantageously, in particular precisely, quickly and/or reliably, using a machine-learned model.

In one embodiment, the first process comprises a transfer movement of the lifted load arrangement using the robot, in one embodiment out of the pick-up area or pick-up container and/or to a (first) picking station, in one further development the release of the lifted load arrangement at the (first) picking station can in particular consist of this.

Additionally or alternatively, in one embodiment, the second process comprises a complete deactivation or a partial deactivation of the lifting state of the gripper, in particular a deactivation of one or more of its lifting devices. In one embodiment, this deactivation does not take place at the (first) picking station, in one embodiment at any picking station.

Additionally or alternatively, in one embodiment, the third process comprises a complete deactivation or a partial deactivation of the lifting state of the gripper, in particular different from the second process, in particular a deactivation of another group of its lifting devices. In one embodiment, this deactivation does not take place at the (first) picking station, in one embodiment at any picking station.

In one development, the second and/or third process comprises the (complete or partial) deactivation of the lifting state over the pick-up area. As a result, in one embodiment, an excessive number of lifted objects or loads or incorrect objects or loads can be quickly and/or reliably lifted (again) in a subsequent cycle.

In a further development, the second process comprises a picking operation which differs from the first process and in one embodiment is sequential, in particular the release of a first part of the lifted load arrangement at the (first) picking station and the release of another part of the lifted load arrangement at another picking station or at the same (first) picking station after further processing, in particular removal, of the released first part.

Additionally or alternatively, in a further development, the third process comprises a picking operation which differs from the first and/or second processes and in one embodiment is sequential, in particular the release of a first part of the lifted load arrangement at the (first) picking station, the release of a second part of the lifted load arrangement at the other picking station or at the same (first) picking station after further processing, in particular removal, of the released first part, and the release of a further part of the lifted load arrangement at the other or the same (first) picking station after further processing, in particular removal, of the released second part. Likewise, in one embodiment, the second process can also comprise a picking operation which differs from the first process and in particular is sequential, and the third process can comprise a deactivation of the lifting state of the gripper over the pick-up area, so that in one embodiment (only) two lifted objects or loads are picked sequentially, and more than two lifted objects or loads are released in the pick-up area.

In one embodiment, the second and/or third process (in each case) comprises a deposition movement of the lifted load arrangement using the robot, which in this case guides or continues to carry the load arrangement ("guided deposition movement of the lifted load arrangement"), in particular in the pick-up area and/or before deactivation of the lifting state. In this way, lifted objects or loads can be protected when the lifting state is deactivated. Likewise, objects or loads can be dropped by deactivation of the lifting state and in particular process time can be saved thereby.

In one embodiment, the partial deactivation of the lifting state of the gripper in the second and/or third process (in each case) comprises a deactivation of at least one of the lifting devices, while at least one further of the lifting devices which is identified as load-bearing remains activated. As explained above, in one embodiment, the classes differ from one another in the distribution of the loads lifted by the gripper relative to or on the gripper, so that, in one embodiment, all the lifting devices of the gripper are deactivated in a targeted manner except for one of the lifting devices identified as load-bearing or a group of the lifting devices identified as bearing the same load together.

In particular, in the case of a (classified) multiple grip, certain lifting devices, in particular suckers, can thus advantageously be deactivated in a targeted manner in order to handle only a desired number or type of objects or loads with the robot.

In one embodiment, the load arrangement lifted by the gripper is classified using the machine-learned model (also) on the basis of a detected movement of the lifted load arrangement using the robot. It has been found that the additional consideration of the detected movement of the lifted load arrangement in the classification using machine-learned models can be particularly advantageous and in particular can improve the precision, reliability and/or speed of the classification.

In one embodiment, the model has at least one artificial neural network, in one development a network with 1D convolution. Such machine-learned models are particularly advantageous for the present classification in particular due to their learning behavior and/or their precision, reliability and/or speed.

In one embodiment, the model is mechanically learned by lifting one or more load arrangements with the gripper of the robot, which in the present case is/are referred to as the learning load arrangement(s) without limiting the generality, wherein, in one further development, the class of this at least one learning load arrangement is input manually or automatically, in one embodiment using an automated identification, for example by means of image processing or image evaluation or the like, or is specified by only partial activation of the gripper, in one embodiment activation of only one of its lifting devices. Additionally or alternatively, in one embodiment, the model can be mechanically learned by lifting multiple different learning load arrangements with the gripper of the robot.

As a result, the machine learning in one embodiment can be greatly improved, in particular in combination with two or more of these features.

According to one embodiment of the present invention, a system for handling a load arrangement with a robot is configured, in particular in terms of hardware and/or software, in particular in terms of programming, to carry out a method described herein and/or comprises:

means for activating a lifting state of a gripper of the robot for load lifting;

means for determining a parameter of a time profile of a load-arrangement-dependent force variable using at least one sensor of the robot during a movement of the lifted load arrangement;

means for classifying a load arrangement lifted by the gripper using a machine-learned model on the basis of the determined parameter, in particular during a movement of the lifted load arrangement and/or over a pick-up area in which the load arrangement has been situated for lifting, in particular a pick-up area of a pick-up station and/or over or in a pick-up container; and means for:

carrying out a first process with the robot if the load arrangement has been classified into a first class; and/or carrying out a second process with the robot if the load arrangement has been classified into a second class.

In one embodiment, the system or its means comprises:

means for carrying out a third process with the robot if the load arrangement has been classified into a third class; in particular, carrying out a fourth process with the robot if the load arrangement has been classified into a fourth class; and/or means for machine learning the model by lifting at least one learning load arrangement with the gripper of the robot, in particular means for manually or automatically inputting the class of this at least one learning load arrangement or specifying by only partial activation of the gripper, in particular only one of its lifting devices, means for machine learning the model by lifting multiple different learning load arrangements with the gripper of the robot.

A means within the meaning of the present invention may be designed in hardware and/or in software, and in particular may comprise a data-connected or signal-connected, in particular, digital, processing unit, in particular micropro-cessor unit (CPU), graphic card (GPU) having a memory and/or bus system or the like and/or one or a plurality of programs or program modules. The processing unit may be designed to process commands that are implemented as a program stored in a memory system, to detect input signals from a data bus and/or to output output signals to a data bus. A storage system may comprise one or a plurality of, in particular different, storage media, in particular optical, magnetic, solid-state, and/or other non-volatile media. The program may be designed in such a way that it embodies or is capable of carrying out the methods described herein, so that the processing unit is able to carry out the steps of such methods and thus, in particular, is able to control or regulate the robot. In one embodiment, a computer program product may comprise—and may in particular, be—a particularly non-volatile storage medium for storing a program, or having a program stored thereon, wherein an execution of this program causes a system or a controller, in particular a computer, to carry out the method described herein, or one or multiple steps thereof.

In one embodiment, one or more, in particular all, steps of the method are carried out completely or partially automati-cally, in particular by the system or its means.

In one embodiment, the system comprises the robot.

In one embodiment, "over a pick-up area" refers to a position (as seen) horizontally at least partially within (an outer boundary) of the pick-up area in a conventional manner.

An embodiment of the present invention is particularly advantageous for gripping unknown object types, the weight of which is also not known in advance, or is used for this purpose.

BRIEF DESCRIPTION OF THE DRAWINGS

The accompanying drawings, which are incorporated in and constitute a part of this specification, illustrate exem-plary embodiments of the invention and, together with a general description of the invention given above, and the detailed description given below, serve to explain the prin-ciples of the invention.

DETAILED DESCRIPTION

Figure 1:
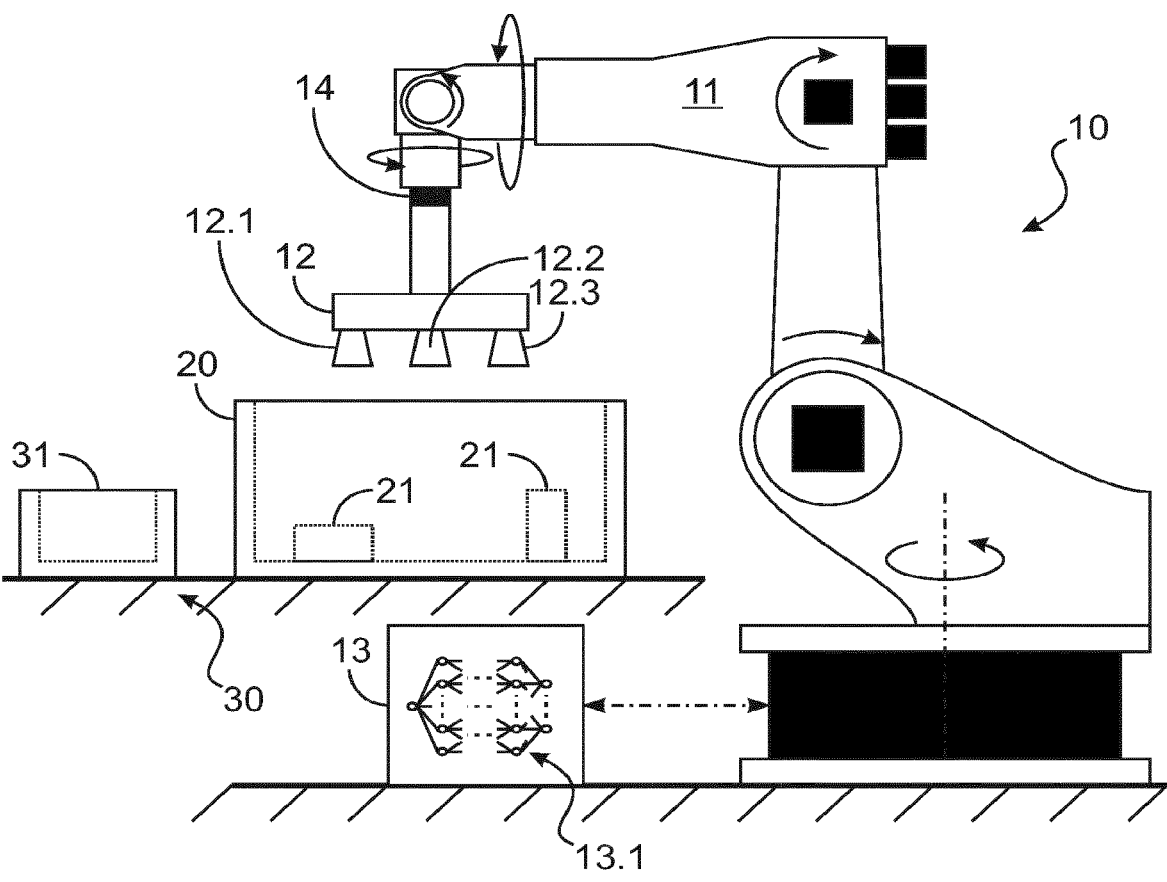
FIG. 1 schematically illustrates a system according to an embodiment of the present invention.

FIG. 1 shows a system for carrying out a method accord-ing to an embodiment of the present invention.

A robot 10 has a multi-axis robot arm 11 and a gripper 12 with, by way of example, three suckers 12.1-12.3 and is intended to pick up objects or loads 21 from a pick-up container 20 and, at a picking station 30, put them individu-ally into packages 31 provided there.

Figure 2:
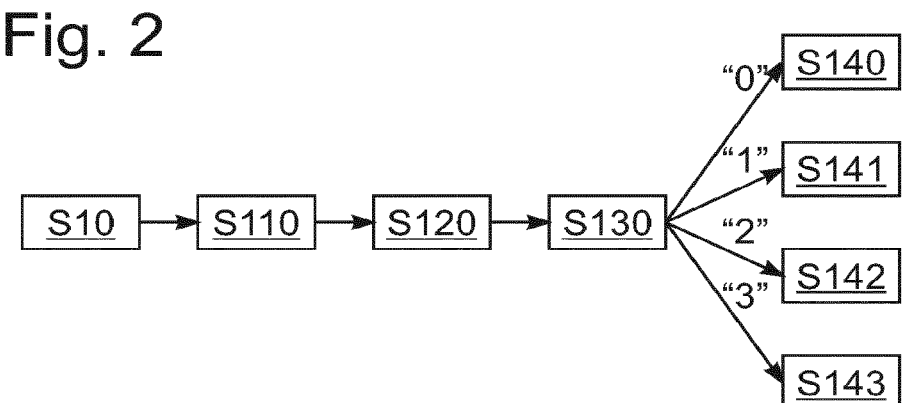
FIG. 2 illustrates an exemplary method according to an embodiment of the present invention.

For this purpose, a robot controller 13 carries out the method sketched in FIG. 2:

In a step S110, the robot 10 moves its gripper 12 into the pick-up container 20 and activates its lifting state or all the suckers 12.1-12.3. In this way, at least one of the objects 21 can be (pneumatically) gripped with high probability.

In a second step S120, the robot 10 lifts the gripper 12 upwards together with the lifted load arrangement. In the process, a force/torque sensor 14 between the gripper 12 and the robot arm 11 continuously or at discrete intervals cap-tures a vertical force component which depends on the lifted load arrangement. The sequence of the corresponding mea-surement signals of the sensor 14 forms a (parameter of a) time profile of a load-arrangement-dependent force variable. In modifications, in particular additionally or alternatively, other force and/or torque components can be captured and/or, additionally or alternatively to the force/torque sen-sor 14, sensors can be used on the axes or joints of the robot arm and/or one or more strain gages can be used on the gripper 12, and/or additionally or alternatively to the time profiles themselves, for example frequency analyses or mean values of the time profiles or the like can be used as parameters.

During this movement, during which the lifted load arrangement is still in or over the pick-up container 20, a machine-learned model, in the exemplary embodiment a trained artificial neural network 13.1, classifies the load arrangement lifted by the gripper on the basis of the deter-mined parameter into one of the four classes "one object lifted" (=first class), "two objects lifted" (=second class), "more than two objects lifted" (=third class) or "no object lifted" (=fourth class), these classes being purely by way of example. In modifications, in particular other and/or more or fewer classes can be provided, for example only {"one object lifted" (=first class) and "multiple objects lifted" (=second class)}, or {"one object lifted" (=first class), "two objects lifted" (=second class) and "more than two objects lifted" or "no object lifted" (=third class)}, or {"one object lifted" (=first class), "multiple objects lifted" (=second class) and "no object lifted" (=third class)}. In one embodiment, in step S120, for example, axis positions of the robot can additionally be detected by sensors, wherein the artificial neural network 13.1 then classifies the load arrangement lifted by the gripper also on the basis of these actual values.

If the load arrangement has been assigned to the first class, i.e., if it was determined on the basis of the (parameter of the) time profile of the load-arrangement-dependent force variable that only one object is lifted (S130: "1"), the robot will carry out a transfer movement of the lifted load arrangement out of the pick-up area to the picking station 30 and release the object or the load arrangement there into the provided package 31 by deactivating all the suckers 12.1-12.3 (S141).

If the load arrangement has been assigned to the second class, i.e., if it was determined on the basis of the (parameter of the) time profile of the load arrangement-dependent force variable that two objects are lifted (S130: "2"), in a step S142, the controller 13 will deactivate all the suckers 12.1-12.3 except for one, while the gripper is still in or over the pick-up container 20, so that the excess gripped object falls back into the said container, and subsequently put the one object which is still being held by means of this still active/activated sucker into the provided package 31, as in step S141.

Alternatively, it is also possible for all the suckers 12.1-12.3 to be deactivated in step S142, while the gripper is still in or over the pick-up container 20, so that all the gripped objects fall back into said container, and then a new attempt to grip only one object is carried out analogously to step S140.

Further alternatively, in step S142, the provided package 31 can also initially be approached as in step S141 and only a part of the suckers can be deactivated, in particular the suckers which have been identified as bearing the same load, while the other suckers are still active/activated, so that only one object is put into the provided package 31, and then, after removal of the package and provision of the next package, the other suckers are deactivated so that the second object is put into the newly provided package.

It is possible to proceed in an analogous manner (step S143) if the load arrangement has been assigned to the third class, i.e., it was determined on the basis of the (parameter of the) time profile of the load arrangement-dependent force variable that more than two objects are lifted (S130: "3"). As in the case of the second class, in particular excess gripped objects can be dropped in or over the pick-up container 20 or sequentially picked, or all the objects can be dropped and a new gripping attempt can be carried out.

If the load arrangement was assigned to the fourth class "no object lifted" (S130: "0"), a new gripping attempt is carried out (S140).

In order to train the artificial neural network 13.1 for the above-mentioned method or to learn the model mechanically, a lifting operation is carried out in advance in a step S10 for the respective object type or load type, wherein it is certain that only a single object is lifted, either because only a single object is present (and is also lifted), or because it is confirmed by an operator or image recognition that only a single object is lifted. In this way, machine learning can be improved. Additionally or alternatively, multiple different types of objects can also be lifted sequentially, preferably each individually, with the gripper 12 in step S10, and the artificial neural network 13.1 can be trained thereby or in the process.

Although embodiments have been explained in the preceding description, it is noted that a large number of modifications are possible.

Thus, in particular, steps S140 and/or S143 can be omitted; in one embodiment the single object can be picked normally (S141—first process) if the lifted load arrangement has been classified into the "single grip" class (S130: "1") and otherwise all the suckers 12.1-12.3 can be deactivated when still in or over the pick-up container 20 (S142—second process) if the lifted load arrangement has been classified into the "multiple grip" class (S130: "2"), wherein in one further development, a new lifting attempt can additionally be started directly in the case of classification into the class "failed grip" (S130: "0" or S140—third process), wherein, in one further development, a new lifting attempt can additionally be started directly in the case of classification into the class "failed grip" (S130: "0" or S140—third process) or an empty gripper or failed grip can also be detected or treated in another way, in particular without a corresponding class or classification.

It is also noted that the embodiments are merely examples that are not intended to restrict the scope of protection, the applications, and the structure in any way. Rather, the preceding description provides a person skilled in the art with guidelines for implementing at least one embodiment, with various changes, in particular with regard to the function and arrangement of the described components, being able to be made without departing from the scope of protection as it arises from the claims and from these equivalent combinations of features.

Thus, in addition to or instead of the number, in particular the type of objects lifted can also be classified, and type-specific processes can be carried out on this basis.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

10 Robot
11 Robot arm
12 Gripper
12.1-12.3 Suckers (pneumatic lifting device)
13 Controller
13.1 Artificial neural network
14 Force sensor
20 Pick-up container
21 Object/load
30 Picking station

11

31 Package

What is claimed is:

1. A method for handling a load arrangement with a robot, the method comprising:

activating a lifting state of a gripper of the robot for load lifting;

determining a parameter of a time profile of a load-arrangement-dependent force variable using at least one sensor of the robot during a movement of the lifted load arrangement;

classifying the load arrangement lifted by the gripper using a machine-learned model on the basis of the determined parameter; and at least one of:

carrying out a first process with the robot in response to the load arrangement being classified into a first class, or carrying out a second process with the robot in response to the load arrangement being classified into a second class;

wherein the robot is controlled to carry out the first process or the second process based on a distribution of the load relative to the gripper.

2. The method of claim 1, wherein the load arrangement is at least one of:

classified during a movement of the lifted load arrangement;

classified during a movement of the lifted load arrangement over a pick-up area in which the load arrangement has been situated for lifting;

classified during a movement of the lifted load arrangement over a pick-up area of a pick-up station; or classified during a movement of the lifted load arrangement over or in a pick-up container.

3. The method of claim 1, further comprising at least one of:

carrying out a third process with the robot in response to the load arrangement being classified into a third class; or carrying out a fourth process with the robot in response to the load arrangement being classified into a fourth class.

4. The method of claim 1, wherein the classes differ from one another in at least one of the number, distribution, or type of loads lifted by the gripper.

5. The method of claim 3, wherein the classes differ from one another in at least one of the number, distribution, or type of loads lifted by the gripper.

6. The method of claim 1, wherein at least one of:

the gripper has at least two lifting devices;

the sensor is arranged on the gripper, between the gripper and a robot arm to which it is fastened, or on the robot arm; or the force variable depends on at least one of:

at least one load-arrangement-dependent force component, or at least one load-arrangement-dependent torque component.

7. The method of claim 6, wherein at least one of:

the at least two lifting devices of the gripper are suction devices; or the at least one load-arrangement-dependent force component is a vertical load-arrangement-dependent force component.

8. The method of claim 3, wherein at least one of:

the first process comprises a transfer movement of the lifted load arrangement using the robot;

the second process comprises at least one of:

a complete or partial deactivation of the lifting state of the gripper, a different picking operation from the first process or, a repetition of a lifting attempt; or the third process comprises at least one of:

a complete or partial deactivation of the lifting state of the gripper, a different picking operation from the first and second processes, or a repetition of a lifting attempt.

9. The method of claim 8, wherein at least one of:

the transfer movement of the first process is at least one of a movement out of the pick-up area, or a movement to a picking station;

the deactivation of the gripper in at least one of the second or third processes comprises at least one of deactivating one or more of the lifting devices of the gripper, or deactivating the gripper over the pick-up area; or the different picking operation of at least one of the second or third processes is a sequential picking operation.

10. The method of claim 8, wherein at least one of:

at least one of the second or third processes comprises a guided deposition movement of the lifted load arrangement using the robot; or the partial deactivation of the lifting state of the gripper comprises a deactivation of at least one of the lifting devices, while at least one further of the lifting devices which is identified as load-bearing remains activated.

11. The method of claim 10, wherein the guided deposition movement of the lifted load arrangement is at least one of a movement in the pick-up area, or a movement before deactivation of the lifting state.

12. Method of claim 1, wherein at least one of:

the machine-learned model has at least one artificial neural network; or the machine-learned model is machine-learned by lifting at least one learning load arrangement with the gripper of the robot.

13. The method of claim 12, wherein at least one of:

the class of the at least one learning load arrangement is input manually or automatically, or is specified by only partial activation of the gripper; or the model is mechanically learned by lifting multiple different learning load arrangements with the gripper of the robot.

14. The method of claim 13, wherein specifying the class of the at least one load arrangement by partial activation of the gripper comprises specifying by activation of only one of the lifting devices of the gripper.

15. A system for handling a load arrangement with a robot, the system comprising:

means for activating a lifting state of a gripper of the robot for load lifting;

means for determining a parameter of a time profile of a load-arrangement-dependent force variable using at least one sensor of the robot during a movement of the lifted load arrangement;

means for classifying the load arrangement lifted by the gripper using a machine-learned model on the basis of the determined parameter; and means for at least one of:

carrying out a first process with the robot in response to the load arrangement being classified into a first class, or carrying out a second process with the robot in response to the load arrangement being classified into a second class;

wherein the robot is controlled to carry out the first process or the second process based on a distribution of the load relative to the gripper.

16. The system of claim 15, wherein the means for classifying is configured for at least one of:

classifying the load arrangement during a movement of the lifted load arrangement;

classifying the load arrangement during a movement of the lifted load arrangement over a pick-up area in which the load arrangement has been situated for lifting;

classifying the load arrangement during a movement of the lifted load arrangement over a pick-up area of a pick-up station; or classifying the load arrangement during a movement of the lifted load arrangement over or in a pick-up container.

17. A computer program product for handling a load arrangement with a robot and comprising a program code stored on a non-transitory, computer-readable medium, the program code, when executed by a computer, causing the computer to:

activate a lifting state of a gripper of the robot for load lifting;

determine a parameter of a time profile of a load-arrangement-dependent force variable using at least one sensor of the robot during a movement of the lifted load arrangement;

classify the load arrangement lifted by the gripper using a machine-learned model on the basis of the determined parameter; and at least one of:

carry out a first process with the robot in response to the load arrangement being classified into a first class, or carry out a second process with the robot in response to the load arrangement being classified into a second class;

wherein the robot is controlled to carry out the first process or the second process based on a distribution of the load relative to the gripper.

18. The computer program product of claim 17, wherein the program code further causes the computer to at least one of:

classify the load arrangement during a movement of the lifted load arrangement;

classify the load arrangement during a movement of the lifted load arrangement over a pick-up area in which the load arrangement has been situated for lifting;

classify the load arrangement during a movement of the lifted load arrangement over a pick-up area of a pick-up station; or classify the load arrangement during a movement of the lifted load arrangement over or in a pick-up container.

\* \* \* \* \*